(12) United States Patent
Zhong

(10) Patent No.: US 9,166,774 B2
(45) Date of Patent: Oct. 20, 2015

(54) DECOUPLING BANG-BANG CDR AND DFE

(75) Inventor: Lizhi Zhong, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1325 days.

(21) Appl. No.: 12/974,601

(22) Filed: Dec. 21, 2010

(65) Prior Publication Data
US 2012/0155530 A1    Jun. 21, 2012

(51) Int. Cl.
H04L 27/01 (2006.01)
H04B 1/02 (2006.01)
H04L 7/033 (2006.01)
H04L 25/03 (2006.01)
H04L 7/00 (2006.01)

(52) U.S. Cl.
CPC ............. *H04L 7/033* (2013.01); *H04L 7/0087* (2013.01); *H04L 25/03057* (2013.01); *H04L 7/0083* (2013.01)

(58) Field of Classification Search
USPC .................. 375/219, 222, 229–236, 240.29, 375/240.26–240.28, 316, 346, 347, 354, 375/362, 364, 365, 366, 371, 373–376, 285, 375/350, 220, 221, 240.27
See application file for complete search history.

(56) References Cited

U.S. PATENT DOCUMENTS

| | | | |
|---|---|---|---|
| 5,581,585 A * | 12/1996 | Takatori et al. | 375/376 |
| 8,929,496 B2 * | 1/2015 | Lee et al. | 375/355 |
| 2006/0239341 A1 | 10/2006 | Marlett et al. | 375/233 |
| 2007/0230640 A1 * | 10/2007 | Bryan et al. | 375/349 |
| 2007/0253475 A1 * | 11/2007 | Palmer | 375/229 |
| 2009/0256629 A1 * | 10/2009 | Tseng et al. | 329/310 |
| 2010/0080282 A1 * | 4/2010 | Zhong et al. | 375/233 |
| 2010/0103998 A1 * | 4/2010 | Erba et al. | 375/233 |
| 2010/0104000 A1 * | 4/2010 | Pozzoni | 375/233 |
| 2010/0135378 A1 * | 6/2010 | Lin et al. | 375/233 |
| 2010/0215091 A1 * | 8/2010 | Palmer | 375/232 |
| 2010/0284686 A1 * | 11/2010 | Zhong | 398/1 |
| 2010/0329326 A1 * | 12/2010 | Aziz et al. | 375/233 |
| 2011/0068840 A1 * | 3/2011 | Williams et al. | 327/156 |
| 2012/0057626 A1 * | 3/2012 | Zhong | 375/233 |

* cited by examiner

*Primary Examiner* — Linda Wong
(74) *Attorney, Agent, or Firm* — Suiter Swantz pc llo

(57) ABSTRACT

An apparatus including a bang-bang clock data recovery module and a decision feedback equalizer. A phase detector of the bang-bang clock and data recovery module may be configured to eliminate coupling between the bang-bang clock and data recovery module and the decision feedback equalizer based upon an error signal of the decision feedback equalizer and a predetermined coefficient.

20 Claims, 13 Drawing Sheets

US 9,166,774 B2

DECOUPLING BANG-BANG CDR AND DFE

FIELD OF THE INVENTION

The present invention relates to the communications field generally and, more particularly, to a method and/or apparatus for decoupling bang-bang CDR and DFE.

BACKGROUND OF THE INVENTION

Clock and Data Recovery (CDR) circuits form a part of Serializer/Deserializer (SerDes) receivers. The CDR circuits track the phase of a sampling clock based on some criterion, such as minimizing a Mean-Squared-Error (MSE). Conventional CDR circuits are commonly designed to achieve low target bit-error-ratios (BER) on the order of $10^{-12}$ to $10^{-15}$ errors per bit. One category of CDR circuits commonly used is bang-bang CDR. Bang-bang CDR is widely used in SerDes circuits due to superior jitter tolerance and insensitivity to the Nyquist data pattern (i.e., 1010 . . . ).

When bang-bang CDR and a decision feedback equalizer (DFE) are implemented together in a receiver, coupling between bang-bang timing loops and the DFE can occur. Due to the coupling, the point at which bang-bang CDR will settle moves to the left of the pulse response (or the left of center with respect to a slicer input eye). The coupling between bang-bang timing loops and the DFE feedback can cause the sampling phase to continue moving further to the left, creating a snowball effect that can result in error propagation. The jitter tolerance of bang-bang CDR is reduced since the sampling phase is no longer at the center of the eye.

It would be desirable to have a method and/or apparatus to eliminate coupling between bang-bang CDR and DFE when implemented together.

SUMMARY OF THE INVENTION

The present invention concerns an apparatus including a bang-bang clock data recovery module and a decision feedback equalizer. A phase detector of the bang-bang clock and data recovery module may be configured to eliminate coupling between the bang-bang clock and data recovery module and the decision feedback equalizer based upon an error signal of the decision feedback equalizer and a predetermined coefficient.

The objects, features and advantages of the present invention include providing a method and/or apparatus for decoupling bang-bang CDR and DFE that may (i) provide a new equation for bang-bang CDR, (ii) use a crossing sample after the data sample for bang-bang CDR, (iii) sample a signal prior to decision feedback equalization (DFE) to obtain a crossing sample, (iv) provide increased jitter tolerance, (v) reduce error propagation, (vi) reduce bit error rate, thus enhancing performance, and/or (vii) be easily implemented.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
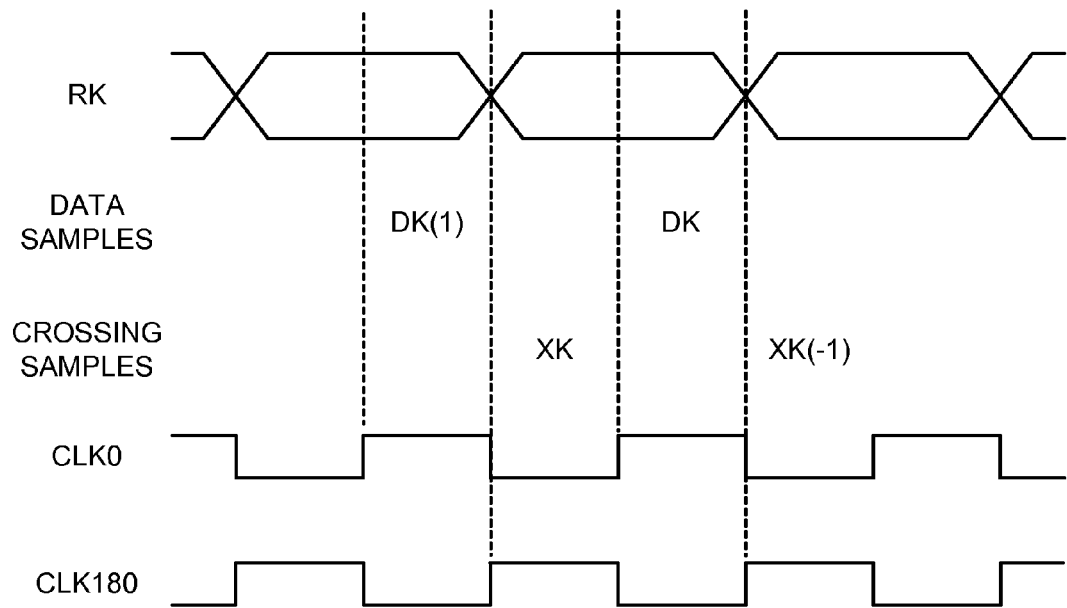
FIG. 1 is a diagram illustrating relationships between phases of a sampling clock signal and a data sampling eye in a 1T architecture.

Embodiments of the present invention generally eliminate coupling between bang-bang timing loops and a decision feedback equalizer (DFE). In one embodiment, the present invention generally introduces a modification to a bang-bang CDR equation, for example, in a receiver application. For example, instead of using a product of a crossing sample (e.g., XK) and a subsequent data sample (e.g., DK(1)), a receiver circuit in accordance with an example embodiment of the present invention may implement a bang-bang CDR equation using the product (XK−ALPHA*ERK)*DK(1), where ERK is an error signal (e.g., RK−H0*DK) defined for DFE, and RK is the input to a detector (e.g., slicer, etc.) of the receiver circuit. In another example, a product of a data sample (e.g., DK) and the crossing sample after the data sample (e.g., XK(−1)) may be used, making the bang-bang CDR equation XK(−1)*DK. The circuit using the product of the data sample and the crossing sample immediately following the data sample may be implemented with a 2T-DFE, where T represents a symbol period. The 2T-DFE generally allows performance criteria to be met using slower speed components. In still another example, the bang-bang CDR circuit may be configured to use take the crossing sample from the received signal prior to addition of the DFE feedback.

In a bang-bang, or Alexander type CDR, a received signal (e.g., RK) is sampled twice each symbol period. The symbol period is generally called a Unit Interval (UI). Ideally, one sample is obtained at a crossing boundary by a crossing latch and another sample is obtained at a center of a detector input "eye" by a data latch. The crossing sample and data sample may be controlled by respective clock signals (e.g., CLK90 and CLK180). The clock signals CLK90 and CLK180 generally have phases that are 90 degrees apart. In one example, two consecutive "center" data samples (e.g., DK(1) and DK) and the crossing sample in-between (e.g., XK) may be used to decide whether a current sampling phase is lagging or leading. The sampling phase may then be corrected accordingly.

Bang-bang CDR is widely used in serializer/deserializer (SerDes) circuits due to superior jitter tolerance and insensitivity to the Nyquist data pattern (i.e., 1010 . . . ). However, bang-bang CDR may function as a one-tap edge-equalized decision feedback equalizer (DFE): EK*DK(1). The error signal EK is defined the same way as that for edge equalization: EK=XK if DK=−DK(1) and EK=0 otherwise. The signal XK is the crossing sample at the kth symbol (e.g., a sample of the crossing between the data sample of the (k−1)th symbol (e.g., DK(1)) and the data sample of the kth symbol (e.g., DK)). As used herein, DK represents the data sample of the kth symbol (or current data sample), DK(1) represents the data sample of the (k−1)th symbol (or previous data sample), and DK(x) represents the data sample of the (k−x)th symbol. If the sign of the previous data sample DK(1) is negative, the sign of the current data sample DK is positive, and the sign of the crossing sample XK is positive, the phase should be reduced to move the sampling point left (e.g., advance the sampling time). According to the equation EK*DK(1)=XK*DK(1)=1*(−1)=−1, the phase should also move left. In general, bang-bang CDR works similarly to a one-tap edge-equalized DFE for all combinations of DK(1), DK, and XK, except the cases where DK(1), DK, and XK are all 1 or −1.

For the above reason, bang-bang CDR will settle to where XK*DK(1)=0. XK may be expressed by the following Equation 1:

$$XK=(P(0.5)-P(-0.5))*DK(1)+P(1.5)*DK(2)+\ldots,\quad \text{EQ. 1}$$

where P(0.5) is the pulse response sampled at t=0.5 UI, and similar notations for others terms. Applying Equation 1, XK*DK(1) (P(0.5)−P(−0.5))*DK(1)*DK(1)+P(1.5)*DK(1)*DK(2)+. Because DK(1)=1 or −1, DK(1)*DK(1)=1 all the time. Because DK(1) and DK(2) are independent and are either 1 or −1, a long term average of XK*DK(1) will have the term related to DK(1)*DK(2) tend to be zero. A similar result occurs for the other terms as well. Consequently, the long term average (e.g., performed by a large accumulator) of XK*DK(1) is P(0.5)−P(−0.5). Therefore, without the DFE feedback, bang-bang CDR would settle to where the long term average is zero, or P(0.5)−P(−0.5)=0.

Referring to FIG. 1, a diagram is shown illustrating a phase relationship between a number of clock signals (e.g., CLK0 and CLK180) and a data sampling input eye of an input signal (e.g., RK). The clock signals CLK0 and CLK180 may be implemented as phases of a sampling clock signal. In one example, a rising edge of the clock signal CLK180 generally occurs 180 degrees after a rising edge of the clock signal CLK0. Clock signals with other phases may be implemented accordingly to meet the design criteria of a particular implementation. The phase and frequency of the clock signals CLK0 and CLK180 may be adjusted such that the rising edge of the clock signal CLK0 corresponds with the center of a data input eye for the signal RK and the rising edge of the clock signal CLK180 corresponds with the crossing point of the signal RK. However, other relationships may be implemented accordingly to meet the design criteria of a particular implementation.

Figure 2:
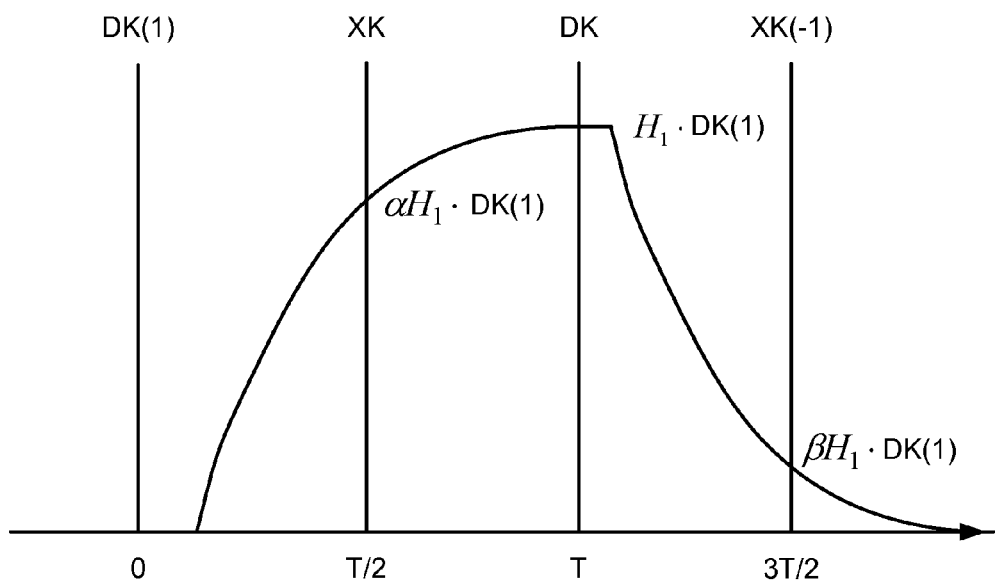
FIG. 2 is a diagram illustrating a DFE feedback waveform.

Referring to FIG. 2, a diagram is shown illustrating a DFE feedback waveform. When bang-bang CDR is used together with a DFE, coupling between the bang-bang CDR and the DFE may occur for the reason presented above. The DFE feedback is not only applied at the data sample, but also at a crossing sample prior to the data sample and a crossing sample following the data sample. In general, a significant portion of the DFE feedback may be applied at the crossing. For example, if the first tap DFE feedback applied at the data sample is expressed as H1*DK(1), the DFE feedback applied at the prior crossing sample may be expressed as ALPHA*H1*DK(1), where ALPHA may range from 40% to 90%, depending on the implementation. After the feedback (e.g., H1*DK(1)) reaches its full level, the feedback is generally reduced to zero. However, the feedback does not reach zero instantaneously. The DFE feedback applied at the subsequent crossing sample may be expressed as BETA*H1*DK(1), where BETA may range from 0% to 100%, depending on the implementation. The terms ALPHA and BETA are used to indicate that different amounts of feedback may be applied at the rising and the falling edges.

In general, for a 2T architecture BETA in the analysis shows that using the right crossing sample has no coupling from the DFE. Although XK(−1) may include the BETA term, the BETA term is averaged out since DK(1) is uncorrelated with DK. Also, when the right crossing is used, DK=−DK(−1) and is uncorrelated with DK(1). When the left crossing is used, DK=−DK(1), so DK is correlated with DK(1). For a 1T architecture, XK(−1) will have both ALPHA and BETA terms. In an nT architecture where n>1, the ALPHA term drops out because the DFE feedback is in a different branch.

Figure 3A:
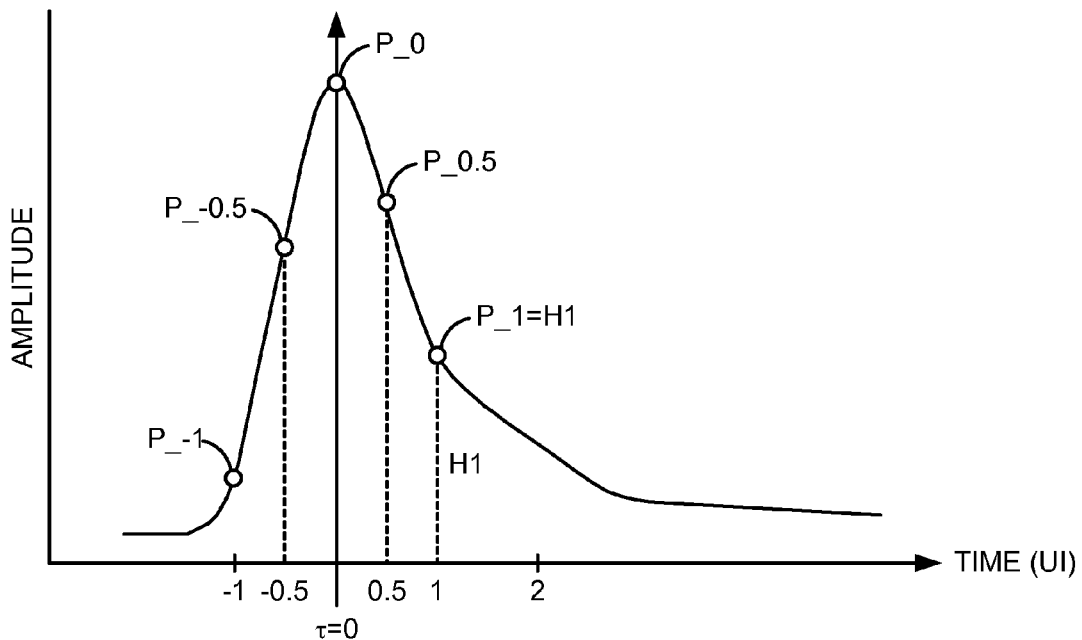
FIGS. 3A and 3B are diagrams illustrating a shift in sampling time due to coupling between bang-bang CDR and DFE.
Figure 3B:
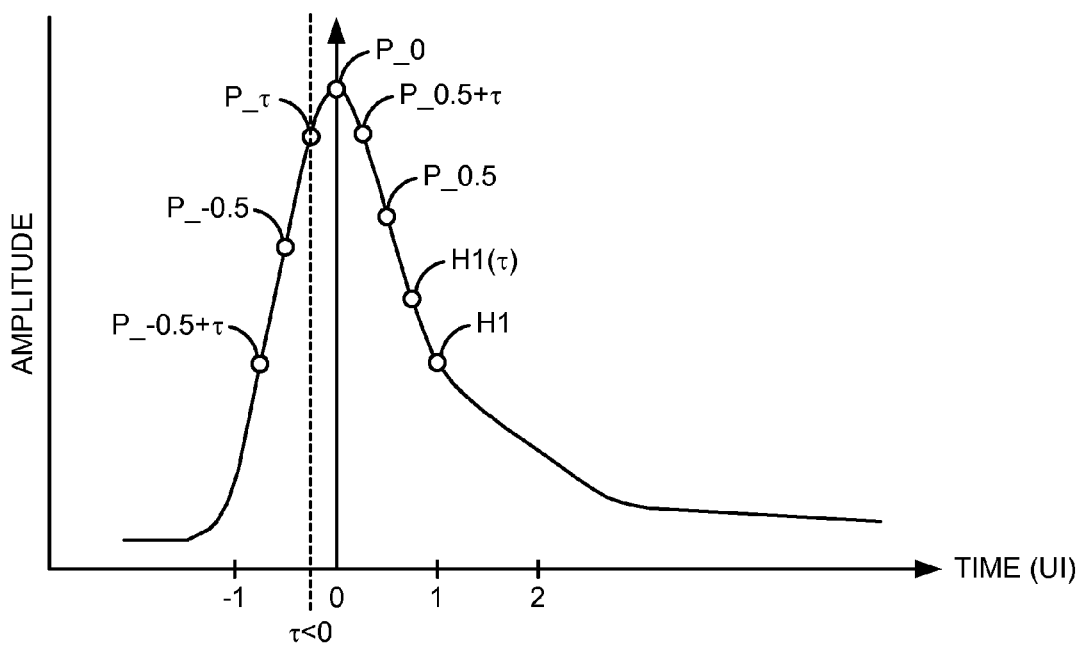

Referring to FIGS. 3A and 3B, diagrams are shown illustrating effects of DFE feedback on sampling phase when no coupling is present (FIG. 3A) and when coupling occurs (FIG. 3B). Taking the DFE feedback into account, Equation 1 may be rewritten as the following Equation 2:

$$XK=(P(0.5)-P(-0.5))*DK(1)-ALPHA*H1*DK(1)+P(1.5)*DK(2)+\ldots \quad \text{Eq. 2}$$

Based on Equation 2, when a DFE is used with the bang-bang CDR, the bang-bang CDR will settle to where P(0.5)−P(−0.5)−ALPHA*H1=0. H1 is generally set to P_1, or converged to P_1, for example, with least mean squares (LMS) adaptation. In general, the DFE will influence where the bang-bang CDR settles through the term ALPHA*H1. For example, in an ideal case where ALPHA=0 (FIG. 3A), the bang-bang CDR will settle to where P(0.5)=P(−0.5). However, if ALPHA>0, the bang-bang CDR will reduce P(0.5) to P(0.5)−ALPHA*H1. To keep P(0.5) the same as P(−0.5), the bang-bang CDR moves the sampling phase left to increase P(0.5) and reduce P(−0.5) until a new balance point is reached where P(0.5)−P(−0.5)−ALPHA*H1=0. The values P(0.5) and P(−0.5) change with the sampling phase.

Referring to FIG. 3B, the coupling between bang-bang CDR and DFE will cause bang-bang CDR to settle to the left (e.g., τ<0) of the pulse response (or the left of the center of the input eye). When the sampling phase is moved to the left, H1 will also increase (e.g., to H1(τ)). When H1 increases, ALPHA*H1 increases causing the sampling phase to move further to the left. A snowball effect may result that produces a very large H1 value, which causes error propagation. The jitter tolerance of bang-bang CDR is reduced since the sampling phase is no longer at the center of the eye.

Figure 4:
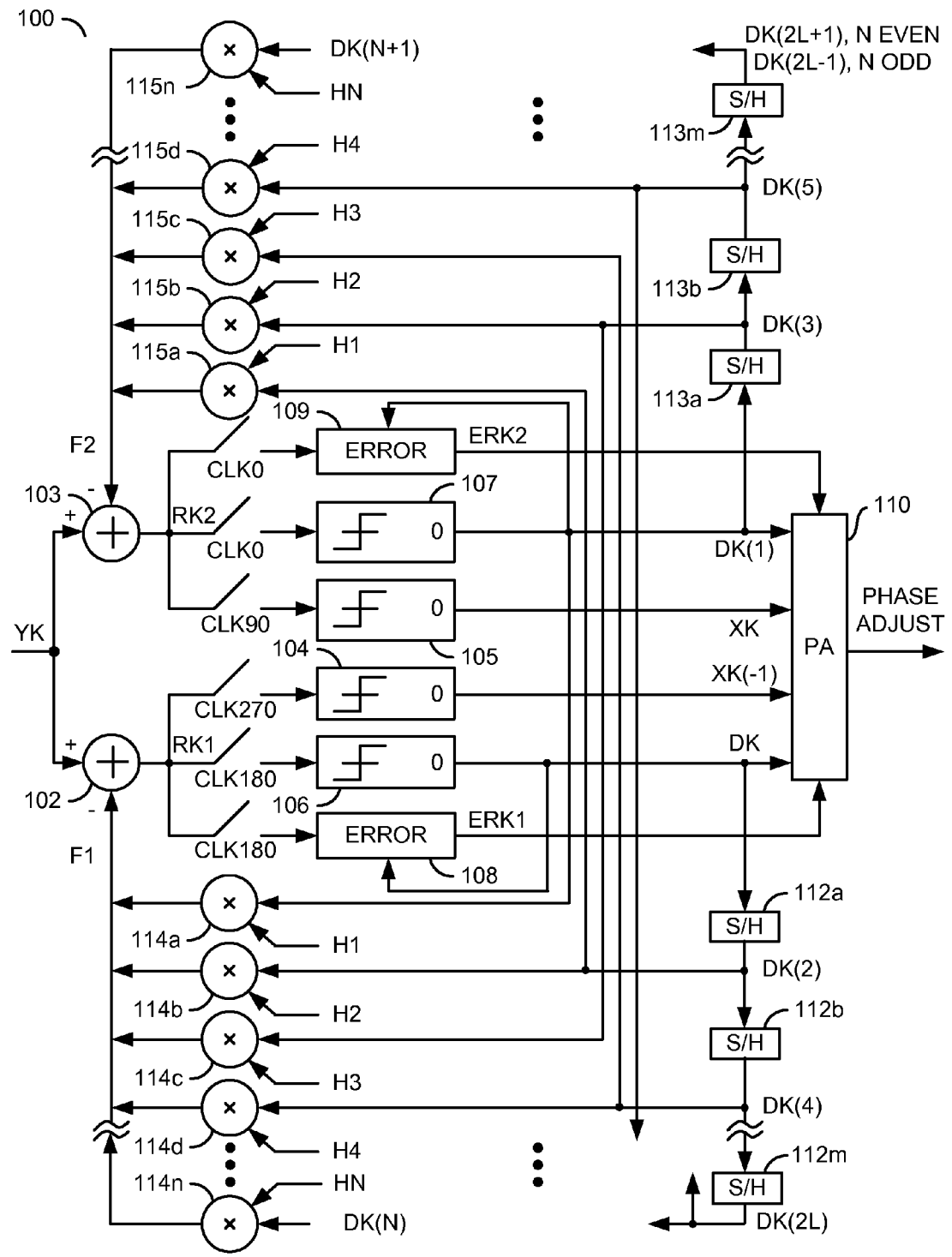
FIG. 4 is a block diagram illustrating a circuit implementing bang-bang CDR and a 2T architecture DFE in accordance with an example embodiment of the present invention.

Referring to FIG. 4, a block diagram of a circuit 100 is shown illustrating an example implementation of bang-bang CDR and DFE in accordance with an example embodiment of the present invention. In one example, the circuit 100 may be implemented in a serializer/deserializer (SerDes) circuit. The circuit 100 may be implemented as part of a receiver. The circuit 100 generally implements a 2T-DFE structure comprising a first half and a second half. In one example, the first half of the circuit 100 may comprise a block (or circuit) 102, a block (or circuit) 104, a block (or circuit) 106, a block (or circuit) 108, a block (or circuit) 110, a number of blocks (or circuits) 112a-112m, and a number of blocks (or circuits) 114a-114n. The second half of the circuit 100 may comprise a block (or circuit) 103, a block (or circuit) 105, a block (or circuit) 107, a block (or circuit) 109, a number of blocks (or circuits) 113a-113m, and a number of blocks (or circuits) 115a-115n. Each half of the circuit 100 implements a respective set of the total number of DFE taps (e.g., N) used to provide decision feedback equalization. Each half of the circuit 100 generates half of the total number of data samples used for DFE. Because each half of the circuit generates only half of the data samples, the two halves may operate at a lower speed (e.g., one-half the data rate) than the data rate of the input signal (e.g., YK). As would be apparent to those skilled in the relevant art based upon the description herein, the architecture of the circuit 100 may be to any nT architecture, where n is an integer (e.g., 1, 2, 3, 4, . . . ). The circuits 102 to 115n may represent modules and/or blocks that may be implemented as hardware, software, a combination of hardware and software, or other implementations.

The circuits 102 and 103 may be implemented as adders. The circuits 104 and 105 may be implemented as crossing latches. The circuits 106 and 107 may be implemented as data latches. Each of the circuits 108 and 109 may implement an error signal generator configured to generate an error signal (e.g., ERK1 and ERK2, respectively). The error signals ERK1 and ERK2 may be used by adaptation loops configured to determine a number of tap weight values (e.g., H1-HN) for the respective DFE taps. The circuit 110 may implement a sampling phase adjustment circuit (PA) in accordance with an example embodiment of the present invention. The circuits 112a-112m and 113a-113m may implement sample and hold or shift register elements. The circuits 114a-114n and 115a-115n may be implemented as multipliers.

The circuit 102 may receive an input signal (e.g., YK) at a first input and a feedback signal (e.g., F1) at a second input. An output of the circuit 102 may present a signal (e.g., RK1) responsive to the input signal YK and the feedback signal F1. The signal RK1 may be presented as an input to the circuits 104, 106, and 108. Specifically, the signal RK1 may be sampled in response to a first clock signal (e.g., CLK270) and the samples presented to an input of the circuit 104. The signal RK1 may be sampled also in response to a second clock signal (e.g., CLK180) and the samples presented to an input of the circuit 106 and an input of the circuit 108.

The circuits 104 and 106 may have a crossing threshold of zero. The circuits 104 and 106 generally present a positive (e.g., 1) output when the sampled signal is above the respective threshold and a negative (e.g., −1) output when the sampled signal is below the respective threshold. The output of the latches 104 and 106 is randomly 1 or −1 when the respective input signals are very close to the threshold value since the difference may be very small and below the sensitivity of the latch (e.g., may take a very long time to integrate to produce a signal that is large enough).

An output of the circuit 104 (e.g., XK(−1)) may be presented to a first input of the circuit 110. An output of the circuit 106 (e.g., DK) may be presented to a second input of the circuit 110, a second input of the circuit 108, and an input of the circuit 112a. An output of the circuit 108 may present the error signal ERK1 to a third input of the circuit 110. An output of the circuit 112a (e.g., DK(2)) may be presented to an input of the circuit 112b, a first input of the circuit 114b, and a first input of the circuit 115a. An output of the circuit 112b (e.g., DK(4)) may be presented to an input of the circuit 112c (not shown), a first input of the circuit 114d, and a first input of the circuit 115c. The circuits 112c-112m may be connected similarly and may present respective data samples (e.g., DK(6), DK(8), DK(2L−2), DK(2L)). The circuit 114a may have a second input that may receive a signal (e.g., H1). The signal H1 may represent a tap weight. The circuits 114b-114n may similarly receive respective tap weight signals (e.g., H2, H3, . . . , H(N−1), HN) and respective data samples (e.g., DK(2), DK(3), DK(N−1), DK(N)).

The tap weights H1, H2, H(N−1), and HN may be determined through adaptation based on the signals RK1, RK2, DK, DK(1), DK(2), DK(3), . . . , DK(N−1), DK(N). In one example, the circuit 108 may implement a sign-sign LMS technique to adjust the tap weights based on the error signals and the data samples. The circuits 112a-112m and 114a-114n are generally part of a decision feedback equalizer that may be implemented using conventional techniques. Outputs of the circuits 114a-114n generally present components of the feedback signal F1 presented to the second input of the circuit 102.

The circuit 103 may receive the input signal YK at a first input and a feedback signal (e.g., F2) at a second input. An output of the circuit 103 may present a signal (e.g., RK2) responsive to the input signal YK and the feedback signal F2. The signal RK2 may be presented as an input to the circuits 105, 107, and 109. Specifically, the signal RK2 may be sampled in response to a third clock signal (e.g., CLK0) and the samples presented to an input of the circuit 105. The signal RK2 may be sampled also in response to a fourth clock signal (e.g., CLK90) and the samples presented to an input of the circuit 107 and an input of the circuit 109. In one example, the clock signals CLK0, CLK90, CLK180, and CLK270 may be implemented as different phases of a sampling clock signal.

The circuits 105 and 107 may have a crossing threshold of zero. The circuits 105 and 107 generally present a positive (e.g., 1) output when the sampled signal is above the respective threshold and a negative (e.g., −1) output when the sampled signal is below the respective threshold. The output of the latches 105 and 107 is randomly 1 or −1 when the respective input signals are very close to the threshold value since the difference may be very small and below the sensitivity of the latch (e.g., may take a very long time to integrate to produce a signal that is large enough).

An output of the circuit 105 (e.g., XK) may be presented to a fourth input of the circuit 110. An output of the circuit 107 (e.g., DK) may be presented to a fifth input of the circuit 110, a second input of the circuit 109, an input of the circuit 113a, and a second input of the circuit 114a. An output of the circuit 113a (e.g., DK(3)) may be presented to an input of the circuit 113b, a first input of the circuit 115b, and an input of the circuit 114c. An output of the circuit 113b (e.g., DK(5)) may be presented to an input of the circuit 113c (not shown), a first input of the circuit 115d, and an input of the circuit 114d. The circuits 113c-113m may be connected similarly and may present respective data samples (e.g., DK(7), DK(9), etc.). The last respective data sample presented by the circuits 113c-113m generally depends upon whether N is even or odd. When N is even, the last respective data sample is DK(2L+1), where L=N/2. When N is odd, the last respective data sample is DK(2L−1), because N/2 is irrational and L is set to the next higher integer (e.g., L=3 when N=5). The circuit 115a may have a second input that may receive the signal H1. The signal H1 may represent a tap weight. The circuits 115b-515n may similarly receive respective tap weight signals (e.g., H2, H3, . . . , H(N−1), H(N)) and respective data samples (e.g., DK(3), DK(4), . . . , DK(N), DK(N+1)).

The circuits 113a-113m and 115a-115n are generally part of a decision feedback equalizer that may be implemented using conventional techniques. Outputs of the circuits 115a-115n generally present components of the feedback signal F2 presented to the second input of the circuit 103.

The circuit 110 may have an output that may present a signal (e.g., PHASE ADJUST) that may adjust the phase of the sampling clock and, consequently, the sampling phases of the circuit 100. Instead of using a product of a crossing sample (e.g., XK) and a subsequent data sample (e.g., DK(1)), the circuit 110 may implement a bang-bang CDR equation based on the product (XK−ALPHA*ERK)*DK(1), where ERK is an error signal (e.g., RK−H0*DK) defined for DFE and RK is the input to a detector of the circuit 100. In general, ERK=H0*DK−RK=−H1*DK(1)−H2*DK(2)−...−HN*DK(N). Thus, ERK*DK(1)=−H1−H2*DK(2)*DK(1)−...−HN*DK(N)*DK(1). The long term average of ERK*DK(1) is therefore −H1. Consequently, the long term average of (XK−ALPHA*ERK)*DK(1) is P(0.5−P(−0.5)−ALPHA*H1−ALPHA*(−H1)=P(0.5)−P(−0.5). Thus, the point where the bang-bang CDR implementation of the circuit 100 settles is independent of DFE.

Figure 5:
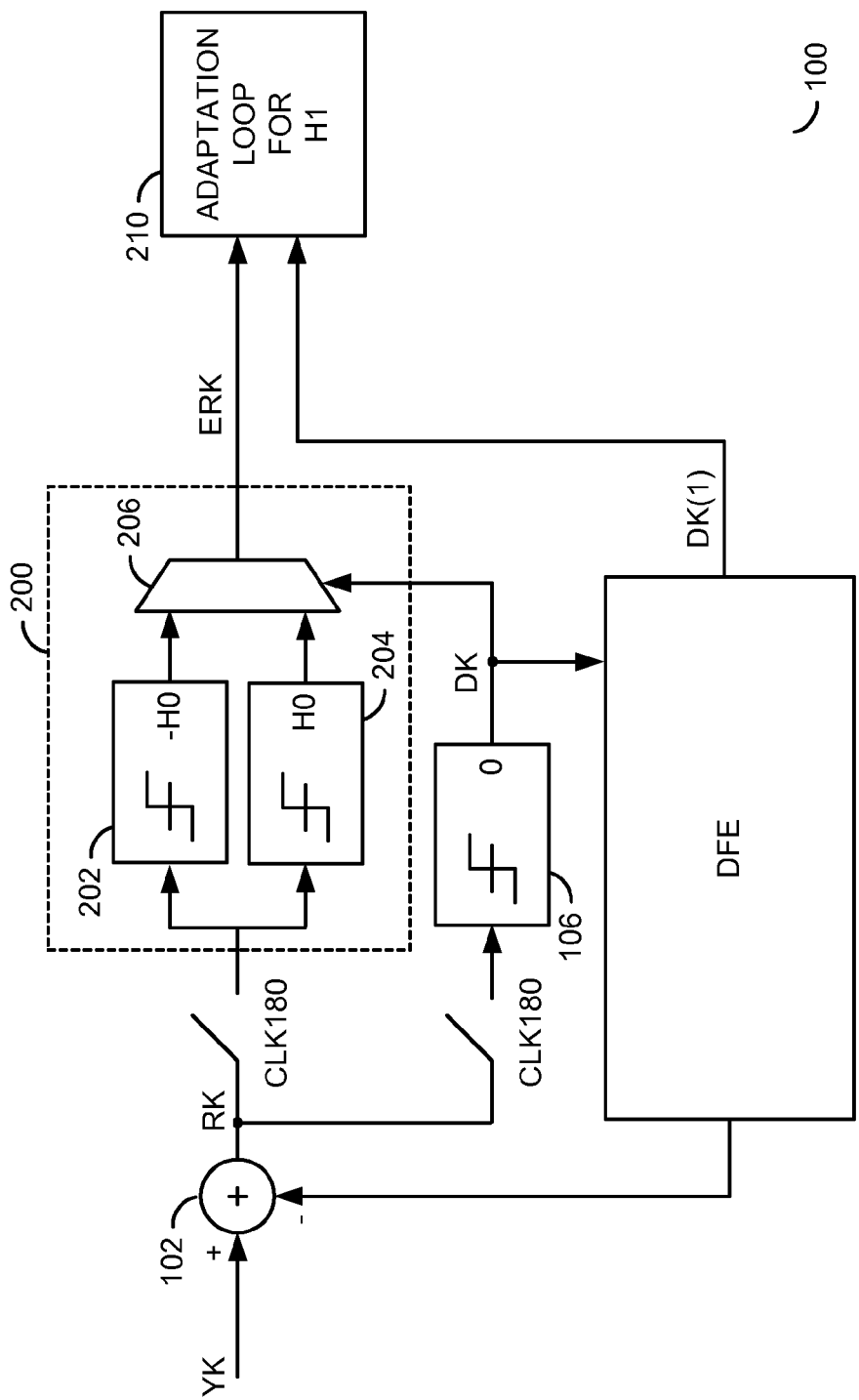
FIG. 5 is a block diagram illustrating generation of an error signal of FIG. 4 in accordance with an example embodiment of the present invention.

Referring to FIG. 5, a block diagram of the circuit 100 is shown illustrating an example implementation of an error signal generating circuit and an adaptation loop for the first DFE tap H1 implemented in accordance with an example embodiment of the present invention. The crossing latch 104 has been omitted for clarity. In one example, the error signal generating circuit 200 may comprise a block (or circuit) 202, a block (or circuit) 204, and a block (or circuit) 206. The circuit 202 may be implemented as a capture latch. The circuit 204 may be implemented as a capture latch. The circuit 206 may be implemented as a multiplexer. The circuits 202 and 204 may have crossing latch thresholds of −H0 and H0, respectively, where H0 represents a target level of the circuit 100. The circuit 200 may be used to implement the circuits 108 and 109 in FIG. 4.

When the circuit 200 is used to implement the circuit 108, the signal RK may be sampled in response to the respective clock signal CLK 180 and the samples presented to an input of the circuit 202 and an input of the circuit 204. An output of the circuit 202 may be presented to a first input of the circuit 206. An output of the circuit 204 may be presented to a second input of the circuit 206. A control input of the circuit 206 may receive the signal DK from the circuit 106. The circuit 206 may have an output that may present the signal ERK.

The adaptation loops of the circuit 100 may include an adaptation loop 210 for the first DFE tap H1. The circuit 210 may implement, in one example, a sign-sign least mean squares (LMS) technique to adjust the tap weight of the first DFE tap H1. The signal ERK may be presented to a first input of the circuit 210. The signal DK(1) may be presented to a second input of the circuit 210. The circuit 210 generally adjusts the tap weight value of the first DFE tap H1 based on a sign-sign least mean squares (LMS) calculation using the signal ERK and the signal DK(1). However, other calculations may be implemented accordingly to meet the design criteria of a particular implementation.

Figure 6A:
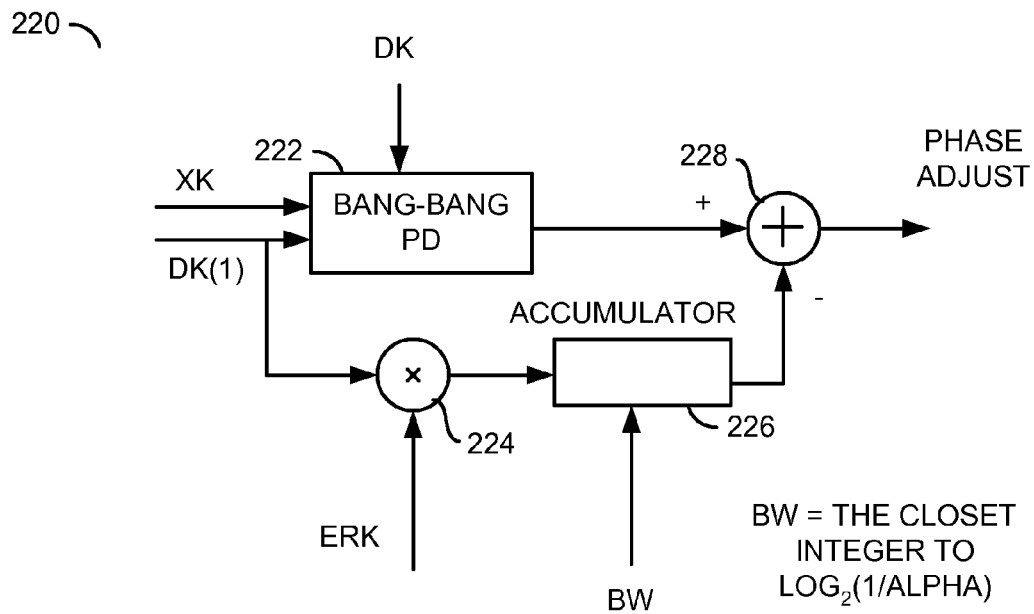
FIGS. 6A and 6B are diagrams illustrating example implementations of the phase detector of FIG. 4 in accordance with example embodiments of the present invention.

Referring to FIG. 6A, a diagram of a circuit 220 is shown illustrating an example implementation of a phase detector of FIG. 4 in accordance with an example embodiment of the present invention. The circuit 220 may comprise a block (or circuit) 222, a block (or circuit) 224, a block (or circuit) 226, and a block (or circuit) 228. The circuit 222 may be implemented as a bang-bang phase detector. The circuit 224 may be implemented as a multiplier. The circuit 226 may be implemented as an accumulator. The circuit 228 may be implemented as an adder.

The circuit 222 may have a first input that may receive the signal DK, a second input that may receive the signal XK, and a third input that may receive the signal DK(1). In one example, the circuit 222 may be configured to implement a transfer function represented by the following TABLE 1:

TABLE 1

| XK | DK(1) | DK | PHASE UP OR DOWN |
|----|-------|----|--------------------|
| 1  | 1     | −1 | 1                  |
| −1 | 1     | −1 | −1                 |
| 1  | −1    | 1  | −1                 |
| −1 | −1    | 1  | 1                  |
| 1  | 1     | 1  | 0                  |
| −1 | 1     | 1  | −1                 |
| −1 | −1    | −1 | 0                  |
| 1  | −1    | −1 | −1                 |

The signal DK(1) may also be presented to a first input of the circuit 224. The signal ERK may be presented to a second input of the circuit 224. An output of the circuit 224 may be presented to a first input of the circuit 226. A signal (e.g., BW) may be presented to a second input of the circuit 226. The signal BW may represent a bandwidth parameter (or threshold) of the circuit 226. In one example, when the content of the circuit 226 exceeds the level specified by the value BW, an output of the circuit 226 may be set, in one example, to a logic 1 and the value BW subtracted from the content. Otherwise, the output of the circuit 226 may remain, for example, at a logic 0. In one example, the signal BW may comprise the closest integer to a value Log 2(1/ALPHA), where ALPHA is determined based upon the DFE feedback curve (described above in connection with FIG. 2), a user input, or configuration parameter. An output of the circuit 222 (e.g., a phase detection signal) may be presented to a first input of the circuit 228. An output of the circuit 226 may be presented to a second input of the circuit 228. The signal PHASE ADJUST may be presented at an output of the circuit 228.

Figure 6B:
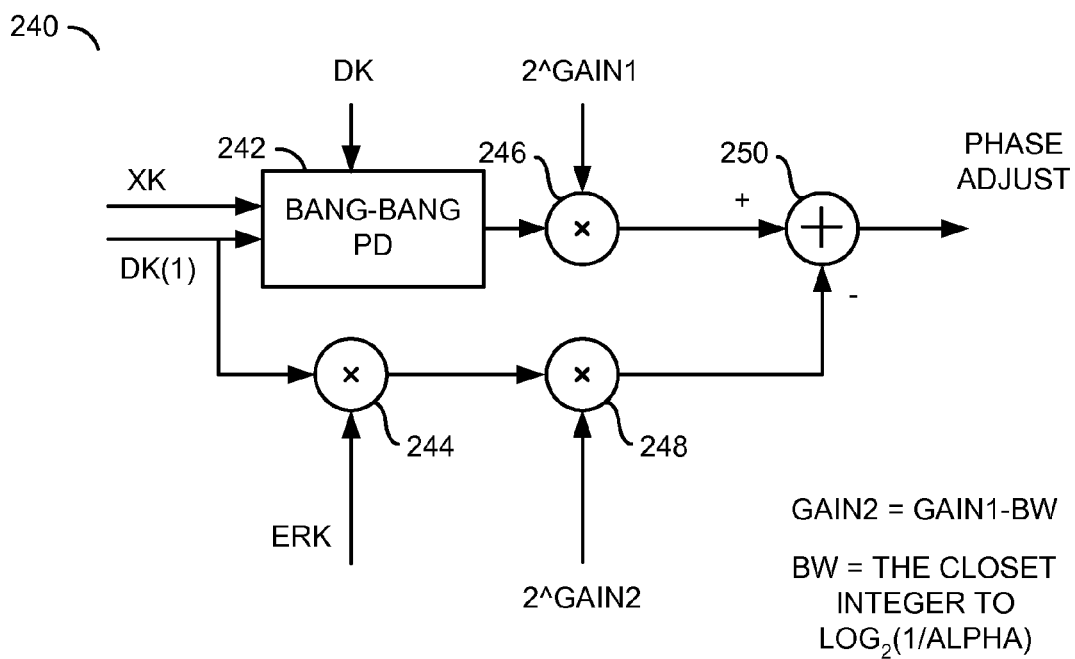

Referring to FIG. 6B, a diagram of a circuit 240 is shown illustrating another example implementation of a phase detector of FIG. 4 in accordance with another example embodiment of the present invention. The circuit 240 may comprise a block (or circuit) 242, a block (or circuit) 244, a block (or circuit) 246, a block (or circuit) 248, and a block (or circuit) 250. The circuit 242 may be implemented as a bang-bang phase detector. The circuits 244, 246 and 248 may be implemented as multipliers. The circuit 250 may be implemented as an adder.

The circuit 242 may have a first input that may receive the signal DK, a second input that may receive the signal XK, and a third input that may receive the signal DK(1). In one example, the circuit 242 may be configured to implement a transfer function illustrated in TABLE 1 above. The signal DK(1) may also be presented to a first input of the circuit 244. The signal ERK may be presented to a second input of the circuit 244. An output of the circuit 242 (e.g., a phase detection signal) may be presented to a first input of the circuit 246. A first gain value (e.g., GAIN1) may be used to generate a first gain signal that may be presented to a second input of the circuit 246. In one example, the first gain signal may be defined as 2^GAIN1. The value GAIN' may be set based upon a user input or configuration parameter.

An output of the circuit 244 may be presented to a first input of the circuit 248. A second gain value (e.g., GAIN2) may be used to generate a second gain signal that may be presented to a second input of the circuit 248. In one example, the second gain signal may be define as 2^GAIN2. In one example, the value GAIN2 may be implemented as a difference of the first gain value GAIN1 and a value BW. The value BW may be set by a user to configure the value GAIN2. In one example, the value BW may comprise the closest integer to the value Log 2(1/ALPHA), where ALPHA is determined based upon the DFE feedback curve (described above in connection with FIG. 2), a user input, or configuration parameter of the circuit 240. An output of the circuit 246 may be presented to a first input of the circuit 250. An output of the circuit 248 may be presented to a second input of the circuit 250. The signal PHASE ADJUST may be presented at an output of the circuit 250.

Figure 7:
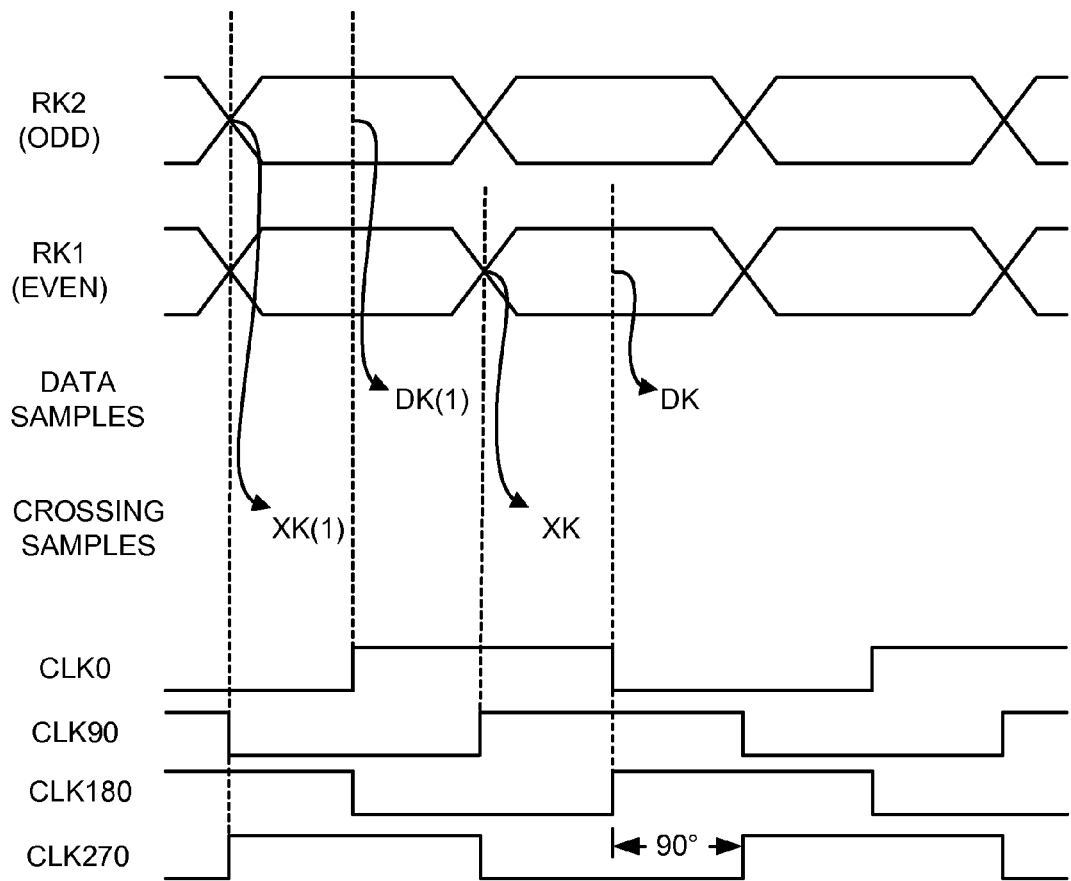
FIG. 7 is a diagram illustrating relationships between phases of a sampling clock signal and the data sampling eye in the 2T architecture of FIG. 4.

Referring to FIG. 7, a diagram is shown illustrating relationships between phases of a sampling clock signal and the data sampling eye in the 2T architecture of FIG. 4. In one example, even data samples (e.g., DK, DK(2), etc.) may be generated by sampling the signal RK1 on the rising edge of the clock signal CLK180. Odd data samples (e.g., DK(1), DK(3), etc.) may be generated by sampling the signal RK2 on the rising edge of the clock signal CLK0. The corresponding crossing samples may be generated similarly using the rising edges of the clock signals CLK90 and CLK270, respectively. In the 2T architecture of FIG. 4, the rising edge of the clock signal CLK90 occurs 90 degrees after the rising edge of the clock signal CLK0, the rising edge of the clock signal CLK180 occurs 90 degrees after the rising edge of the clock signal CLK90, and so on.

Figure 8:
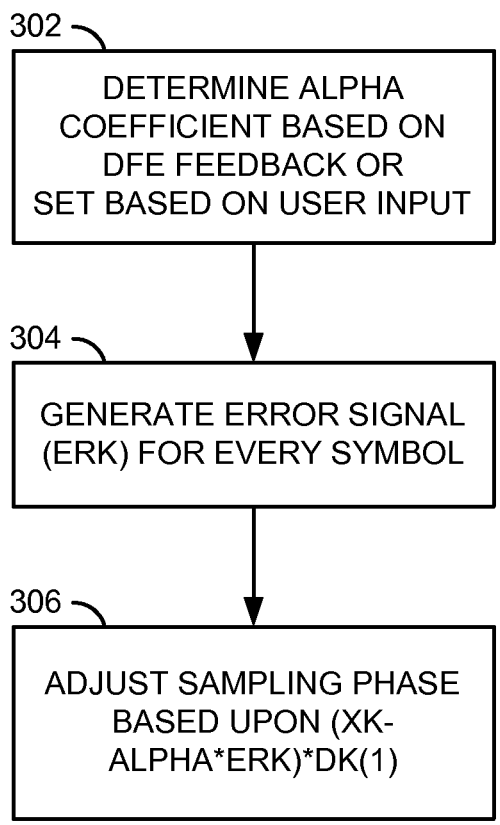
FIG. 8 is a flow diagram illustrating a process for adjusting the phases of the sampling clock of FIG. 4.

Referring to FIG. 8, a flow diagram is shown illustrating a process (or method) 300 for adjusting the phases of the sampling clock of FIG. 4 in accordance with an example embodiment of the present invention. The method 300 may comprise a step (or state) 302, a step (or state) 304, and a step (or state) 306. The step 302 may comprise determining a value for the coefficient ALPHA. When the value of the coefficient ALPHA has been determined (e.g., from the DFE feedback curve, a user input, etc.), the process 300 may move to the step 304. In the step 304, the process 300 generates an error signal (e.g., ERK1, ERK2) for every symbol. When the error signal for a symbol has been generated, the process 300 may move to the step 306. In the step 306, the process 300 adjusts the sampling phase of the circuit 100. In one example, the adjustments to the sampling phase may be based upon the product (XK−ALPHA*ERK)*DK(1).

Figure 9:
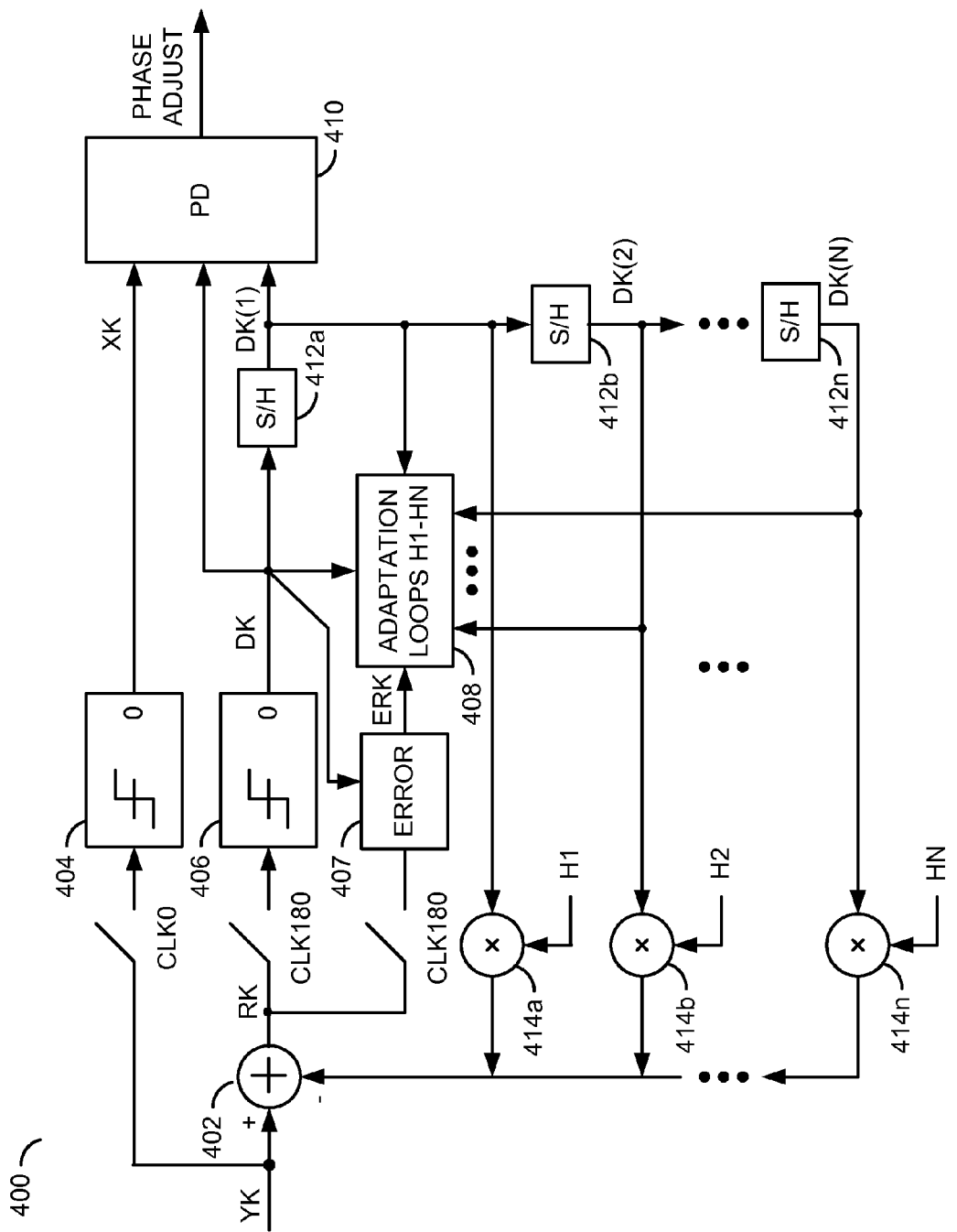
FIG. 9 is a block diagram illustrating a circuit implementing bang-bang CDR and DFE in accordance with another example embodiment of the present invention.

Referring to FIG. 9, a block diagram of a circuit 400 is shown illustrating an example implementation of bang-bang CDR and DFE in accordance with another example embodiment of the present invention. The circuit 400 generally comprises a block (or circuit) 402, a block (or circuit) 404, a block (or circuit) 406, a block (or circuit) 407, a block (or circuit) 408, a block (or circuit) 410, a number of blocks (or circuits) 412a-412n, and a number of blocks (or circuits) 414a-414n. The circuits 402 to 414n may represent modules and/or blocks that may be implemented as hardware, software, a combination of hardware and software, or other implementations.

The circuit 402 may be implemented as an adder. The circuit 404 may be implemented as a crossing latch. The circuit 406 may be implemented as a data latch. The circuit 407 may be implemented as an error detector. The circuit 407 may generate a signal (e.g., ERK) in response to samples of the signal RK and the signal DK. The signal ERK may implement an error signal. The circuit 408 may implement a number of adaptation loops configured to determine a number of tap weight values (e.g., H1-HN) for a number of DFE taps. The circuit 410 may implement a phase detector (PD). The circuits 412a-412n may implement sample and hold or shift register elements. The circuits 414a-414n may be implemented as multipliers.

The circuit 402 may receive an input signal (e.g., YK) at a first input and a feedback signal at a second input. An output of the circuit 402 may present a signal (e.g., RK) responsive to the input signal YK and the feedback signal. The signal YK may be presented as an input to the circuit 404. Specifically, the signal YK may be sampled in response to a first clock signal (e.g., CLK0) and the samples presented to an input of the circuit 404. The signal RK may be presented as an input to the circuits 406 and 407. Specifically, the signal RK may be sampled in response to a second clock signal (e.g., CLK180) and the samples presented to an input of the circuit 406 and an input of the circuit 407.

The circuits 404 and 406 may have a crossing threshold of zero. The circuits 404 and 406 generally present a positive (e.g., 1) output when the sampled signal is above the respective threshold and a negative (e.g., −1) output when the sampled signal is below the respective threshold. The output of the latches 404 and 406 is randomly 1 or −1 when the respective input signals are very close to the threshold value since the difference may be very small and below the sensitivity of the latch (e.g., may take a very long time to integrate to produce a signal that is large enough). The circuit 407 may be implemented using the circuit 200 of FIG. 5.

An output of the circuit 404 (e.g., XK) may be presented to a first input of the circuit 410. An output of the circuit 406 (e.g., DK) may be presented to a second input of the circuit 407, a first input of the circuit 408, a second input of the circuit 410, and an input of the circuit 412a. An output of the circuit 407 may be presented to a second input of the circuit 408. An output of the circuit 412a (e.g., DK(1)) may be presented to a third input of the circuit 408, a third input of the circuit 410, an input of the circuit 412b, and a first input of the circuit 414a. The circuits 412b-412n may be connected similarly and may present respective data samples (e.g., DK(2), DK(N)) to the circuit 408 and the circuits 414b-414n. The circuit 414a may have a second input that may receive a signal (e.g., H1). The signal H1 may represent a tap weight. The circuits 414b-414n may similarly receive respective tap weight signals (e.g., H2 to HN) and respective data samples (e.g., DK(2), . . . , DK(N)).

The circuit 408 may determined, through adaptation, the tap weights H1-HN based on the signals ERK, DK, DK(1), . . . , DK(N). In one example, the circuit 408 may implement a sign-sign LMS technique to adjust the tap weights based on an error signal and the data samples. The circuits 412a-412n and 414a-414n are generally part of a decision feedback equalizer that may be implemented using conventional techniques. Outputs of the circuits 414a-414n generally present components of the feedback signal presented to the second input of the circuit 402. The circuit 410 may have an output that may present a signal (e.g., PHASE ADJUST) that may be used to adjust a sampling phase of the circuit 400. In one example, the circuit 410 may be configured to implement a transfer function represented by TABLE 1 above.

Figure 10:
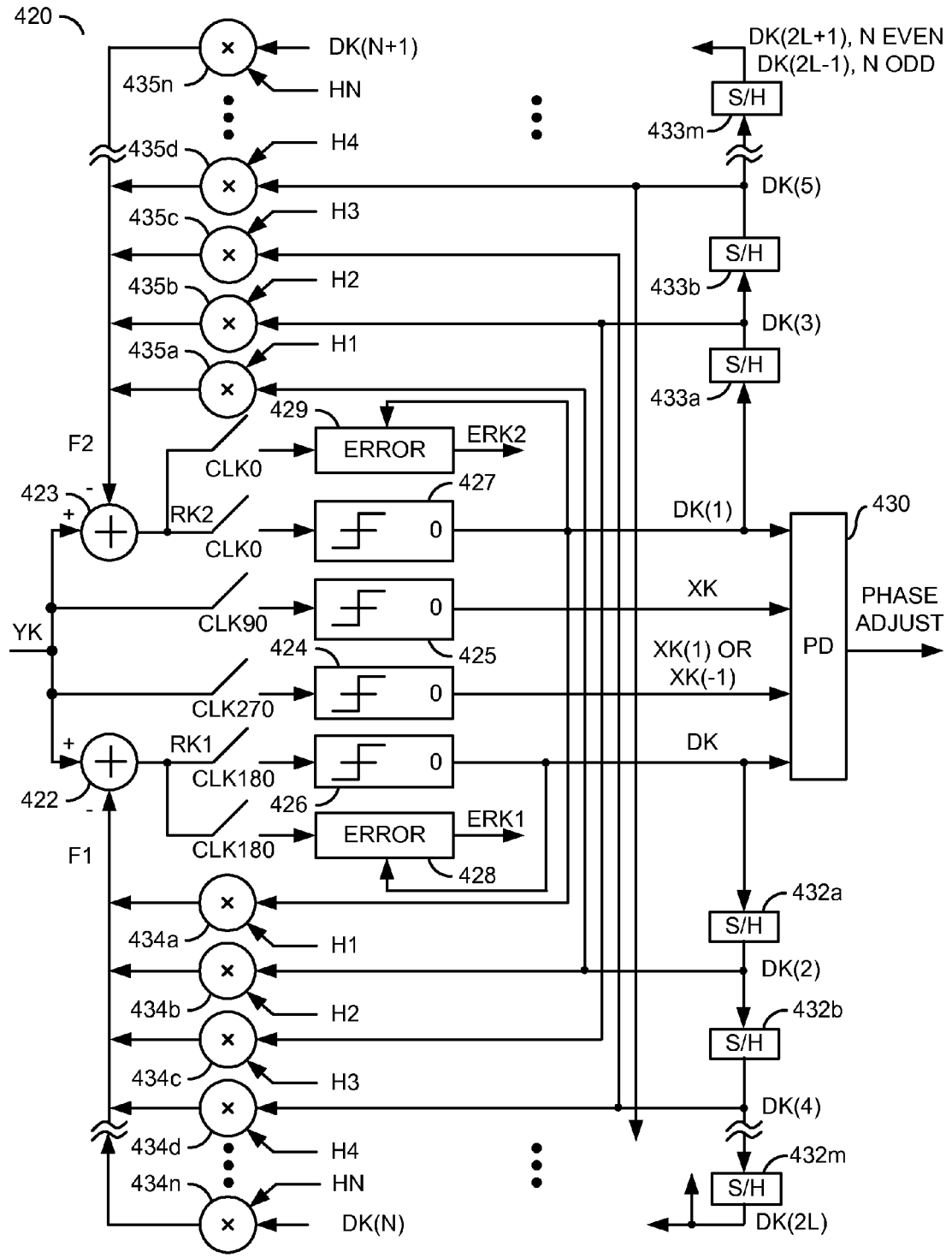
FIG. 10 is a block diagram illustrating an alternative implementation of the circuit of FIG. 9 with a 2T architecture DFE in accordance with another example embodiment of the present invention.

Referring to FIG. 10, a block diagram of a circuit 420 is shown illustrating an alternative example of the circuit of FIG. 9 implemented with a 2T architecture DFE in accordance with another example embodiment of the present invention. The circuit 420 may be implemented similarly to the circuit 100, except that the crossing samples are taken prior to the DFE summing node. The samples presented to the input of the circuits 424 and 425 are generated in response to the clock signals CLK270 and CLK90, respectively. The circuit 424 may be configured to present either XK(1) or XK(−1).

The circuit 420 generally implements a 2T-DFE structure comprising a first half and a second half. In one example, the first half of the circuit 420 may comprise a block (or circuit) 422, a block (or circuit) 424, a block (or circuit) 426, a block (or circuit) 428, a block (or circuit) 430, a number of blocks (or circuits) 432a-432m, and a number of blocks (or circuits) 434a-434n. The second half of the circuit 420 may comprise a block (or circuit) 423, a block (or circuit) 425, a block (or circuit) 427, a block (or circuit) 429, a number of blocks (or circuits) 433a-433m, and a number of blocks (or circuits) 435a-435n. Each half of the circuit 420 generally implements a respective set of the total number of DFE taps (e.g., N) used to provide decision feedback equalization. Each half of the circuit 420 may generate half of the total number of data samples used for DFE. Because each half of the circuit generates only half of the data samples, the two halves may operate at a lower speed (e.g., one-half the data rate) than the data rate of the input signal (e.g., YK). As would be apparent to those skilled in the relevant art based upon the description herein, the architecture of the circuit 420 may be to any nT architecture, where n is an integer (e.g., 1, 2, 3, . . . ). The circuits 422 to 435n may represent modules and/or blocks that may be implemented as hardware, software, a combination of hardware and software, or other implementations.

The circuits 422 and 423 may be implemented as adders. The circuits 424 and 425 may be implemented as crossing latches. The circuits 426 and 427 may be implemented as data latches. Each of the circuits 428 and 429 may implement an error signal generator configured to generate an error signal (e.g., ERK1 and ERK2, respectively). The error signals ERK1 and ERK2 may be used by adaptation loops configured to determine a number of tap weight values (e.g., H1-HN) for the respective DFE taps. The circuit 430 may implement a phase detector (PD) using conventional techniques. The circuits 432a-432m and 433a-433m may implement sample and hold or shift register elements. The circuits 434a-434n and 435a-435n may be implemented as multipliers.

The circuit 422 may receive an input signal (e.g., YK) at a first input and a feedback signal (e.g., FK1) at a second input. An output of the circuit 422 may present a signal (e.g., RK1) responsive to the input signal YK and the feedback signal FK1. The Signal YK may be present to an input of the circuit 424. The signal RK1 may be presented as an input to the circuits 426 and 428. Specifically, the signal YK may be sampled in response to a first clock signal (e.g., either CLK270 or CLK90) and the samples presented to an input of the circuit 424. The signal RK1 may be sampled in response to a third clock signal (e.g., CLK180) and the samples presented to an input of the circuit 426 and an input of the circuit 428.

The circuits 424 and 426 may have a crossing threshold of zero. The circuits 424 and 426 generally present a positive (e.g., 1) output when the sampled signal is above the respective threshold and a negative (e.g., −1) output when the sampled signal is below the respective threshold. The output of the latches 424 and 426 is randomly 1 or −1 when the respective input signals are very close to the threshold value since the difference may be very small and below the sensitivity of the latch (e.g., may take a very long time to integrate to produce a signal that is large enough).

An output of the circuit 424 (e.g., XK(1) or XK(−1)) may be presented to a first input of the circuit 430. An output of the circuit 426 (e.g., DR) may be presented to a second input of the circuit 430, a second input of the circuit 428, and an input of the circuit 432a. An output of the circuit 428 may present the error signal ERK1. An output of the circuit 432a (e.g., DK(2)) may be presented to an input of the circuit 432b, a first input of the circuit 434b, and a first input of the circuit 435a. An output of the circuit 432b (e.g., DK(4)) may be presented to an input of the circuit 432c (not shown), a first input of the circuit 434d, and a first input of the circuit 435c. The circuits 432c-432m may be connected similarly and may present respective data samples (e.g., DK(6), DK(8), . . . , DK(2L−2), DK(2L)). The circuit 434a may have a second input that may receive a signal (e.g., H1). The signal H1 may represent a tap weight. The circuits 434b-434n may similarly receive respective tap weight signals (e.g., H2, H3, . . . , H(N−1), HN) and respective data samples (e.g., DK(2), DK(3), . . . , DK(N−1), DK(N)).

The tap weights H1, H2, . . . , H(N−1), and HN may be determined through adaptation based on the signals RK1, RK2, DK, DK(1), DK(2), DK(3), . . . , DK(N−1), DK(N). In one example, the circuit 428 may implement a sign-sign LMS technique to adjust the tap weights based on an error signal and the data samples. The circuits 432a-432m and 434a-434n are generally part of a decision feedback equalizer that may be implemented using conventional techniques. Outputs of the circuits 434a-434n generally present components of the feedback signal FK1 presented to the second input of the circuit 422.

The circuit 423 may receive the input signal YK at a first input and a feedback signal (e.g., FK2) at a second input. An output of the circuit 423 may present a signal (e.g., RK2) responsive to the input signal YK and the feedback signal FK2. The signal YK may be presented as an input to the circuit 425. The signal RK2 may be presented as an input to the circuits 427 and 429. Specifically, the signal YK may be sampled in response to the clock signal CLK90 or the clock signal CLK270 and the samples presented to an input of the circuit 425. The signal RK2 may be sampled in response to a fourth clock signal (e.g., CLK0) and the samples presented to an input of the circuit 427 and an input of the circuit 429. In one example, the clock signals CLK0, CLK90, CLK180, and CLK270 may be implemented as different phases of a single sampling clock signal.

The circuits 425 and 427 may have a crossing threshold of zero. The circuits 425 and 427 generally present a positive (e.g., 1) output when the sampled signal is above the respective threshold and a negative (e.g., −1) output when the sampled signal is below the respective threshold. The output of the latches 425 and 427 is randomly 1 or −1 when the respective input signals are very close to the threshold value since the difference may be very small and below the sensitivity of the latch (e.g., may take a very long time to integrate to produce a signal that is large enough).

An output of the circuit 425 (e.g., XK) may be presented to a third input of the circuit 430. An output of the circuit 427 (e.g., DK(1)) may be presented to a fourth input of the circuit 430, a second input of the circuit 429, an input of the circuit 433a, and a second input of the circuit 435a. An output of the circuit 433a (e.g., DK(3)) may be presented to an input of the circuit 433b, an input of the circuit 434c, and a first input of the circuit 435b. An output of the circuit 433b (e.g., DK(5)) may be presented to an input of the circuit 433c (not shown), an input of the circuit 434e (not shown), and a first input of the circuit 435d. The circuits 433c-433m may be connected similarly and may present respective data samples (e.g., DK(7), DK(9), etc.). The last respective data sample presented by the circuits 433c-433m generally depends on whether N is even or odd. When N is even, the last respective data sample is DK(2L+1), where L=N/2. When N is odd, the last respective data sample is DK(2L-1), because N/2 is irrational and L is set to the next higher integer (e.g., L=3 when N=5). The circuit 435a may have a second input that may receive the signal H1. The signal H1 may represent a tap weight. The circuits 435b-435n may similarly receive respective tap weight signals (e.g., H2, H3, . . . , H(N-1), H(N)) and respective data samples (e.g., DK(3), DK(4), . . . , DK(N), DK(N+1)). The circuits 433a-433m and 435a-435n are generally part of a decision feedback equalizer that may be implemented using conventional techniques. Outputs of the circuits 435a-435n generally present components of the feedback signal FK2 presented to the second input of the circuit 423.

The circuit 430 may have an output that may present a signal (e.g., PHASE ADJUST) that may be used to adjust the sampling clock and, consequently, the sampling phases of the circuit 420. In one example, the circuit 430 may be configured to implement a transfer function represented by the TABLE 1 above. The circuit 430 generally uses three of the four signals received from the latches 424-427. In general, the 2T architecture presents four inputs to the circuit 430 during every two symbol periods. For example, one data sample and one crossing sample are present every symbol period, which are used by the circuit 430 as illustrated in TABLE 1 above. The circuit 430 generally implements a sliding window technique that adjusts the sampling phase of the circuit 420 using three of the four signals.

Figure 11:
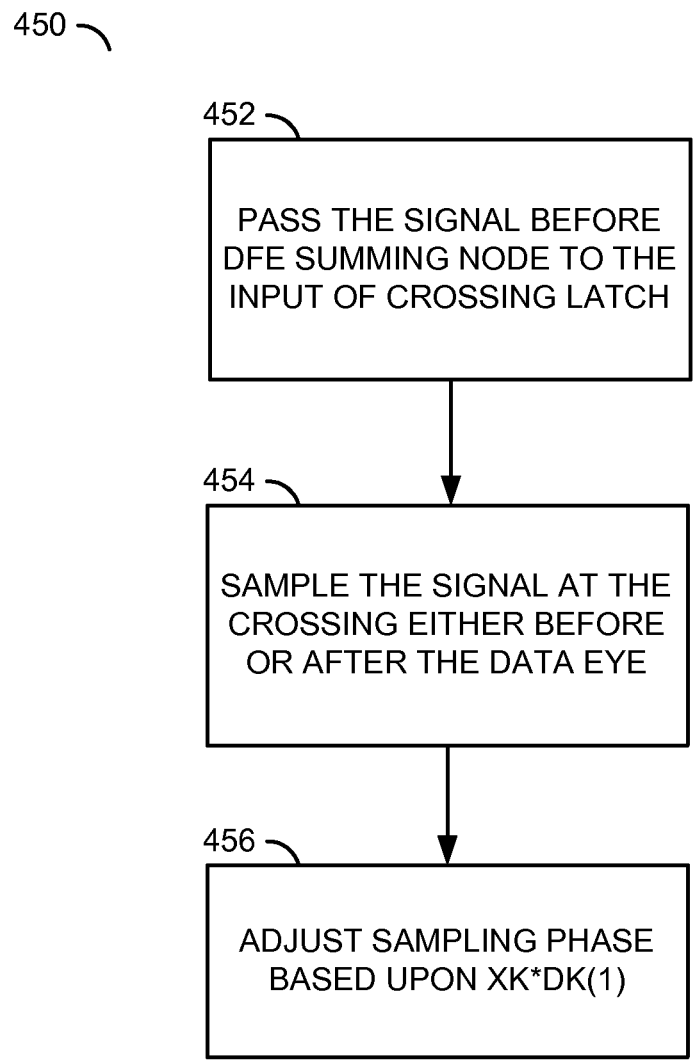
FIG. 11 is a flow diagram illustrating a process for adjusting the phases of the sampling clock of FIGS. 9 and 10.

Referring to FIG. 11, a flow diagram is shown illustrating a process (or method) 450 for adjusting the phases of the sampling clocks of the circuit 400 of FIG. 9 and the circuit 400' of FIG. 10. The method 450 may comprise a step (or state) 452, a step (or state) 454, and a step (or state) 456. In the step 452 the process 450 may pass a signal prior to a DFE summing node to an input of a crossing latch. In the step 454, the process 450 may sample the signal either before or after a data eye. In the step 456, the process 450 may adjust the sampling phase of the circuit 400 or 400'. In one example, the adjustments to the sampling phase may be based upon the product XK*DK(1).

Figure 12:
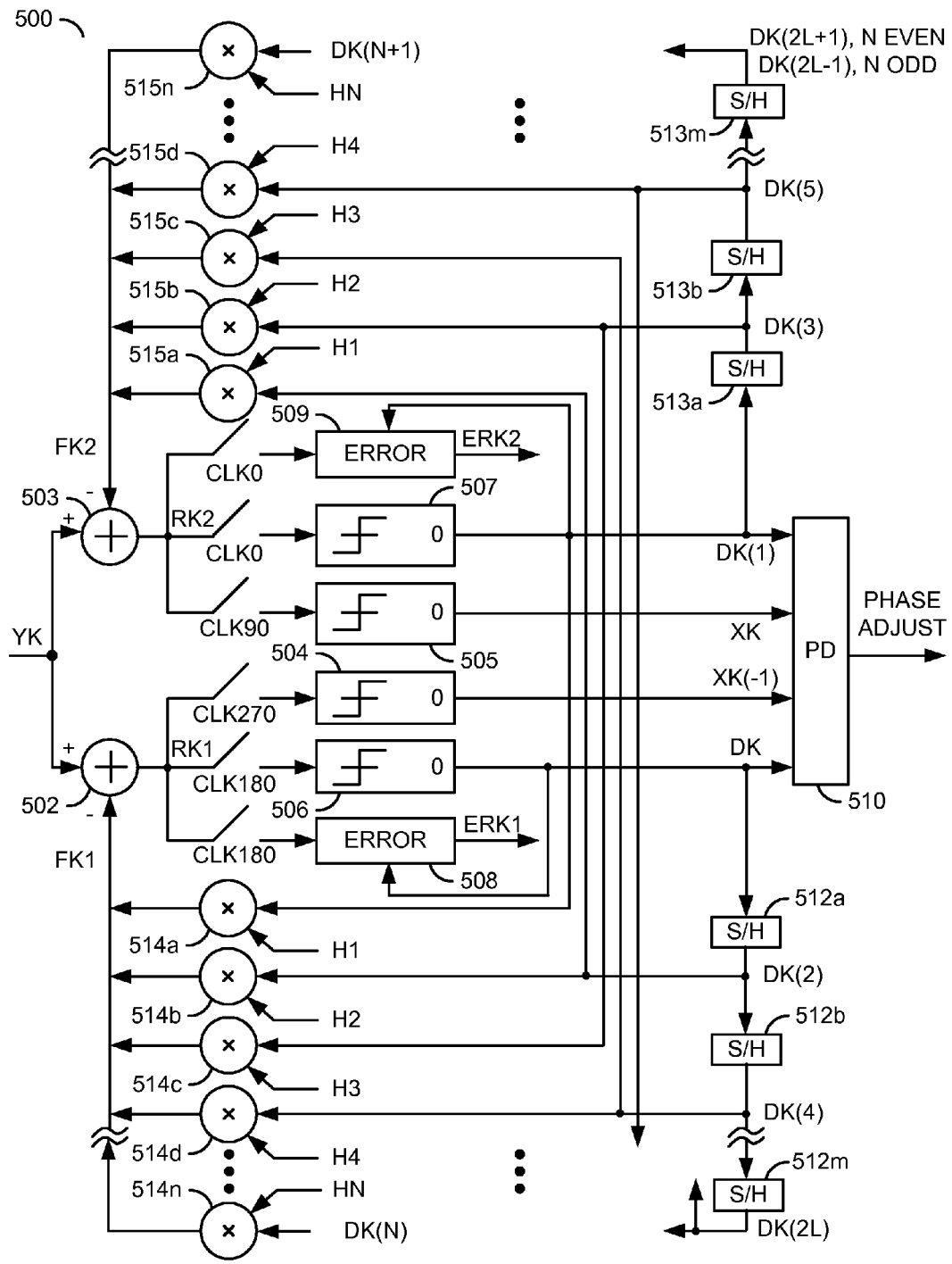
FIG. 12 is a block diagram illustrating a circuit implementing bang-bang CDR and a 2T architecture DFE in accordance with still another example embodiment of the present invention.

Referring to FIG. 12, a block diagram of a circuit 500 is shown illustrating another example implementation of bang-bang CDR and DFE in accordance with another example embodiment of the present invention. In one example, the circuit 500 may be implemented in a serializer/deserializer (SerDes) circuit. The circuit 500 may be implemented as part of a receiver. The circuit 500 generally implements a 2T-DFE structure comprising a first half and a second half. In one example, the first half of the circuit 500 may comprise a block (or circuit) 502, a block (or circuit) 504, a block (or circuit) 506, a block (or circuit) 508, a block (or circuit) 510, a number of blocks (or circuits) 512a-512m, and a number of blocks (or circuits) 514a-514n. The second half of the circuit 500 may comprise a block (or circuit) 503, a block (or circuit) 505, a block (or circuit) 507, a block (or circuit) 509, a number of blocks (or circuits) 513a-513m, and a number of blocks (or circuits) 515a-515n. Each half of the circuit 500 generally implements a respective set of the total number of DFE taps (e.g., N) used to provide decision feedback equalization. Each half of the circuit 500 may generate half of the total number of data samples used for DFE. Because each half of the circuit generates only half of the data samples, the two halves may operate at a lower speed (e.g., one-half the data rate) than the data rate of the input signal (e.g., YK). As would be apparent to those skilled in the relevant art based upon the description herein, the architecture of the circuit 500 may be to any nT architecture, where n is an integer (e.g., 1, 2, 3, . . . ). The circuits 502 to 515n may represent modules and/or blocks that may be implemented as hardware, software, a combination of hardware and software, or other implementations.

The circuits 502 and 503 may be implemented as adders. The circuits 504 and 505 may be implemented as crossing latches. The circuits 506 and 507 may be implemented as data latches. Each of the circuits 508 and 509 may implement an error signal generator configured to generate an error signal (e.g., ERK1 and ERK2, respectively). The error signals ERK1 and ERK2 may be used by adaptation loops configured to determine a number of tap weight values (e.g., H1-HN) for the respective DFE taps. The circuit 510 may implement a phase detector (PD) using conventional techniques. The circuits 512a-512m and 513a-513m may implement sample and hold or shift register elements. The circuits 514a-514n and 515a-515n may be implemented as multipliers.

The circuit 502 may receive an input signal (e.g., YK) at a first input and a feedback signal (e.g., FK1) at a second input. An output of the circuit 502 may present a signal (e.g., RK1) responsive to the input signal YK and the feedback signal FK1. The signal RK1 may be presented as an input to the circuits 504, 506, and 508. Specifically, the signal RK1 may be sampled in response to a first clock signal (e.g., CLK270) and the samples presented to an input of the circuit 504. The signal RK1 may be sampled also in response to a second clock signal (e.g., CLK180) and the samples presented to an input of the circuit 506 and an input of the circuit 508.

The circuits 504 and 506 may have a crossing threshold of zero. The circuits 504 and 506 generally present a positive (e.g., 1) output when the sampled signal is above the respective threshold and a negative (e.g., -1) output when the sampled signal is below the respective threshold. The output of the latches 504 and 506 is randomly 1 or -1 when the respective input signals are very close to the threshold value since the difference may be very small and below the sensitivity of the latch (e.g., may take a very long time to integrate to produce a signal that is large enough).

An output of the circuit 504 (e.g., XK) may be presented to a first input of the circuit 510. An output of the circuit 506 (e.g., DK) may be presented to a second input of the circuit 510, a second input of the circuit 508, and an input of the circuit 512a. An output of the circuit 508 may present the error signal ERK1. An output of the circuit 512a (e.g., DK(2)) may be presented to an input of the circuit 512b, a first input of the circuit 514b, and a first input of the circuit 515a. An output of the circuit 512b (e.g., DK(4)) may be presented to an input of the circuit 512c (not shown), a first input of the circuit 514d, and a first input of the circuit 515c. The circuits 512c-512m may be connected similarly and may present respective data samples (e.g., DK(6), DK(8), . . . , DK(2L-2), DK(2L)). The circuit 514a may have a second input that may receive a signal (e.g., H1). The signal H1 may represent a tap weight. The circuits 514b-514n may similarly receive respective tap weight signals (e.g., H2, H3, . . . , H(N-1), HN) and respective data samples (e.g., DK(2), DK(3), . . . , DK(N-1), DK(N)).

The tap weights H1, H2, H(N-1), and HN may be determined through adaptation based on the signals RK1, RK2, DK, DK(1), DK(2), DK(3), . . . , DK(N-1), DK(N). In one example, the circuit 508 may implement a sign-sign LMS technique to adjust the tap weights based on an error signal and the data samples. The circuits 512a-512m and 514a-514n are generally part of a decision feedback equalizer that may be implemented using conventional techniques. Outputs of the circuits 514a-514n generally present components of the feedback signal FK1 presented to the second input of the circuit 502.

The circuit 503 may receive the input signal YK at a first input and a feedback signal (e.g., FK2) at a second input. An output of the circuit 503 may present a signal (e.g., RK2) responsive to the input signal YK and the feedback signal FK2. The signal RK2 may be presented as an input to the circuits 505, 507, and 509. Specifically, the signal RK2 may be sampled in response to a third clock signal (e.g., CLK360) and the samples presented to an input of the circuit 505. The signal RK2 may be sampled also in response to a fourth clock signal (e.g., CLK90) and the samples presented to an input of the circuit 507 and an input of the circuit 509. In one example, the clock signals CLK0, CLK90, CLK180, and CLK270 may be implemented as different phases of a sampling clock signal.

The circuits 505 and 507 may have a crossing threshold of zero. The circuits 505 and 507 generally present a positive (e.g., 1) output when the sampled signal is above the respective threshold and a negative (e.g., −1) output when the sampled signal is below the respective threshold. The output of the latches 505 and 507 is randomly 1 or −1 when the respective input signals are very close to the threshold value since the difference may be very small and below the sensitivity of the latch (e.g., may take a very long time to integrate to produce a signal that is large enough).

An output of the circuit 505 (e.g., XK) may be presented to a third input of the circuit 510. An output of the circuit 507 (e.g., DK(1)) may be presented to a fourth input of the circuit 510, a second input of the circuit 509, an input of the circuit 513a, and a second input of the circuit 515a. An output of the circuit 513a (e.g., DK(3)) may be presented to an input of the circuit 513b, an input of the circuit 514c, and a first input of the circuit 515b. An output of the circuit 513b (e.g., DK(5)) may be presented to an input of the circuit 513c (not shown), an input of the circuit 514e (not shown), and a first input of the circuit 515d. The circuits 513c-513m may be connected similarly and may present respective data samples (e.g., DK(7), DK(9), etc.). The last respective data sample presented by the circuits 513c-513m generally depends on whether N is even or odd. When N is even, the last respective data sample is DK(2L+1), where L=N/2. When N is odd, the last respective data sample is DK(2L−1), because N/2 is irrational and L is set to the next higher integer (e.g., L=3 when N=5). The circuit 515a may have a second input that may receive the signal H1. The signal H1 may represent a tap weight. The circuits 515b-515n may similarly receive respective tap weight signals (e.g., H2, H3, . . . , H(N−1), H(N)) and respective data samples (e.g., DK(3), DK(4), . . . , DK(N), DK(N+1)). The circuits 513a-513m and 515a-515n are generally part of a decision feedback equalizer that may be implemented using conventional techniques. Outputs of the circuits 515a-515n generally present components of the feedback signal FK2 presented to the second input of the circuit 503.

The circuit 510 may have an output that may present a signal (e.g., PHASE ADJUST) that may be used to adjust the sampling clock and, consequently, the sampling phases of the circuit 500. In one example, the circuit 510 may be configured to implement a transfer function represented by the TABLE 1 above. The circuit 510 generally uses three of the four signals received from the latches 504-507. In general, the 2T architecture presents four inputs to the circuit 510 during every two symbol periods. For example, one data sample and one crossing sample are present every symbol period, which are used by the circuit 510 as illustrated in TABLE 1 above. The circuit 510 generally implements a sliding window technique that adjusts the sampling phase of the circuit 500 using three of the four signals.

Figure 13:
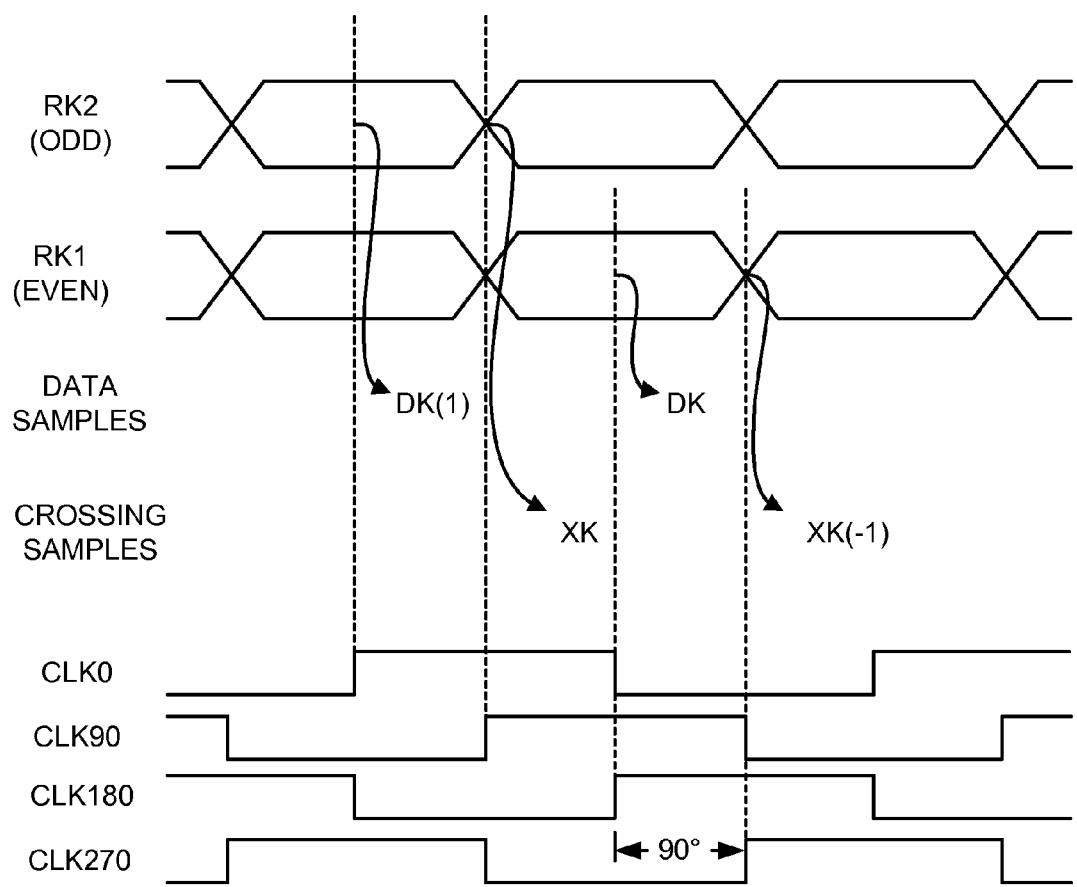
FIG. 13 is a diagram illustrating relationships between phases of the sampling clock signal and the data sampling eye in the 2T architecture of FIG. 12.

Referring to FIG. 13, a diagram is shown illustrating relationships between phases of a sampling clock signal and the data sampling eye in the 2T architecture of FIG. 12. In one example, even data samples (e.g., DK, DK(2), etc.) may be generated by sampling the signal RK1 on the rising edge of the clock signal CLK180. Odd data samples (e.g., DK(1), DK(3), etc.) may be generated by sampling the signal RK2 on the rising edge of the clock signal CLK0. The corresponding crossing samples may be generated similarly using the rising edges of the clock signals CLK90 and CLK270, respectively. In the 2T architecture of FIG. 12, the rising edge of the clock signal CLK90 occurs 90 degrees after the rising edge of the clock signal CLK0, the rising edge of the clock signal CLK180 occurs 90 degrees after the rising edge of the clock signal CLK90, and so on.

Figure 14:
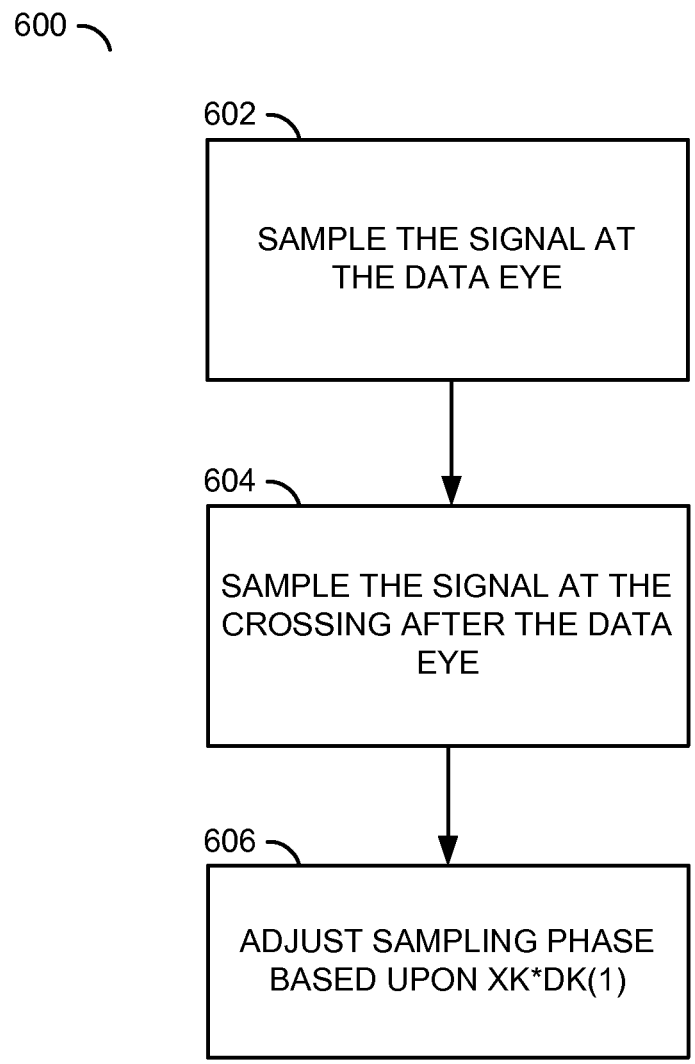
FIG. 14 is a flow diagram illustrating a process for adjusting the phases of the sampling clock of FIG. 12.

Referring to FIG. 14, a flow diagram is shown illustrating a process (or method) 600 for adjusting the phases of the sampling clock of FIG. 12 in accordance with an example embodiment of the present invention. The method 600 may comprise a step (or state) 602, a step (or state) 604, and a step (or state) 606. In the step 602 the process 600 may sample an input signal at a data eye of the signal. In the step 604, the process 600 may sample the signal at a crossing after the data eye. In the step 606, the process 600 may adjust the sampling phase of the circuit 500. In one example, the adjustments to the sampling phase may be based upon the product XK*DK (1).

The functions performed by the diagram of FIGS. 8, 11 and 14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a bang-bang clock and data recovery module; and
   a decision feedback equalizer, wherein a phase detector of said bang-bang clock and data recovery module is configured to generate a first output signal in response to a first data sample, a second data sample, and a crossing sample of a crossing between said first data sample and said second data sample and coupling between said bang-bang clock and data recovery module and said decision feedback equalizer is eliminated by subtracting a mathematical product of said first data sample, an error signal of the decision feedback equalizer, and a predetermined coefficient from said first output signal.

2. The apparatus according to claim 1, wherein the predetermined coefficient is set either based upon a feedback waveform of a first tap of the decision feedback equalizer or based upon user configuration information.

3. The apparatus according to claim 1, wherein said bang-bang clock and data recovery module further comprises:
   a multiplier configured to multiply said first data sample with said error signal;
   an accumulator configured to generate a second output signal in response to the product of said first data sample with said error signal and a bandwidth signal having a value based on said predetermined coefficient; and
   an adder configured to generate a phase adjustment signal in response to said first output signal and said second output signal.

4. The apparatus according to claim 3, wherein the value of said bandwidth signal comprises at least one of a closest integer to a logarithm in base 2 of the inverse of said predetermined coefficient, a floor of the value, and a ceiling of the value.

5. The apparatus according to claim 3, wherein said phase adjustment signal comprises a difference of said first output signal and said second output signal.

6. The apparatus according to claim 1, wherein said bang-bang clock and data recovery module further comprises:
   a first multiplier configured to multiply said first data sample with said error signal;
   a second multiplier configured to apply a first gain to said first output signal;
   a third multiplier configured to apply a second gain to the product of said first data sample with said error signal, wherein said second gain is related to said predetermined coefficient; and
   an adder configured to generate a phase adjustment signal in response to (i) the product of said first gain and said first output signal and (ii) the product of said second gain, said first data sample, and said error signal.

7. The apparatus according to claim 6, wherein said second gain is set based on said first gain and a value of a bandwidth signal comprising at least one of a closest integer to a logarithm in base 2 of the inverse of said predetermined coefficient, a floor of the value, and a ceiling of the value.

8. An apparatus comprising:
   a bang-bang clock and data recovery module; and
   a decision feedback equalizer, wherein said apparatus is configured to reduce an effect on a settling point of said bang-bang clock and data recovery module due to coupling between timing loops of said bang-bang clock and data recovery module and said decision feedback equalizer is based upon a multiplication product of a crossing sample of a crossing immediately following a data sample and the data sample.

9. The apparatus according to claim 8, implemented in an integrated circuit.

10. The apparatus according to claim 9, wherein said bang-bang clock and data recovery module and said decision feedback equalizer are part of a receiver circuit.

11. The apparatus according to claim 8, wherein said decision feedback equalizer comprises multiple branches, each branch comprises a summing node configured to sum an input signal with a respective feedback signal, and each branch captures data and crossing samples of said input signal at a rate lower than a symbol rate of said input signal.

12. The apparatus according to claim 1, wherein said apparatus comprises:
   a first summing node configured to sum an input signal with a first feedback signal;
   a second summing node configured to sum said input signal with a second feedback signal;
   a first circuit configured to generate even crossing samples, even data samples and even error signals for each of said even data samples in response to an output of said first summing node;
   a second circuit configured to generate odd crossing samples, odd data samples and odd error signals for each of said odd data samples in response to an output of said second summing node;
   a third circuit configured to store a plurality of said even data samples;
   a fourth circuit configured to store a plurality of said odd data samples;
   a fifth circuit configured to generate said first feedback signal in response to said plurality of even data samples, said plurality of odd data samples, and a plurality of tap weights;

a sixth circuit configured to generate said second feedback signal in response to said plurality of even data samples, said plurality of odd data samples, and said plurality of tap weights; and said phase detector is configured to adjust a sampling phase of said apparatus based on one of said even data samples, one of said odd data samples, and an intervening one of said even and said odd crossing samples.

13. The apparatus according to claim 12, wherein each of said fifth circuit and said sixth circuit comprises a decision feedback equalizer.

14. The apparatus according to claim 13, wherein the number of data samples stored in each of said third and said fourth circuits is half the number of taps in the decision feedback equalizers.

15. An apparatus comprising:
an adder configured to generate an output signal based upon a difference of an input signal and a feedback signal;
a crossing latch configured to generate crossing samples of said input signal in response to a first phase of a sampling clock;
a data latch configured to generate data samples of said output signal in response to a second phase of said sampling clock;
a decision feedback equalizer configured to generate said feedback signal in response to a plurality of data samples;
an error signal generator configured to generate an error signal in response to a sample of said output signal, a current data sample, and a predetermined target level;
a phase detector configured to (i) receive said current data sample, a current crossing sample, said error signal, and a data sample taken prior to said current crossing sample and (ii) adjust said sampling clock based upon said current data sample, said current crossing sample, said error signal, and said data sample taken prior to said current crossing sample.

16. The apparatus according to claim 15, wherein said apparatus is part of a receiver.

17. A method for decoupling bang-bang clock and data recovery from a decision feedback equalizer comprising the steps of:
(A) generating an error signal based upon a difference between (i) a sample of an input signal and (ii) a mathematical product of a current data sample and a predetermined target value; and
(B) adjusting a sampling phase of a bang-bang clock and data recovery module based upon the error signal, the current data sample, and one of a crossing sample taken prior to the current data sample and a crossing sample taken after the current data sample.

18. The method according to claim 17, further comprising:
generating said crossing sample from a signal taken before a summing node of said decision feedback equalizer.

19. The method according to claim 17, further comprising:
generating a phase adjustment signal using an accumulator with a bandwidth that is configured in response to a predetermined coefficient, wherein the sampling phase adjustment is related to a product of the predetermined coefficient and the error signal.

20. The method according to claim 17, further comprising:
generating a phase detection signal in response to the current data sample, a previous data sample, and a crossing sample taken between the current data sample and the previous data sample, wherein said phase detection signal is generated with a bang-bang phase detector;
generating a first product of said phase detection signal and a first gain signal;
generating a second product of said previous data sample, said error signal, and a second gain signal, wherein said second gain is different from said first gain; and
generating a phase adjustment signal by subtracting the second product from the first product.

\* \* \* \* \*